June 9, 1942.  C. E. SWENSON ET AL  2,285,623
UNIVERSAL JOINT
Filed Aug. 3, 1940
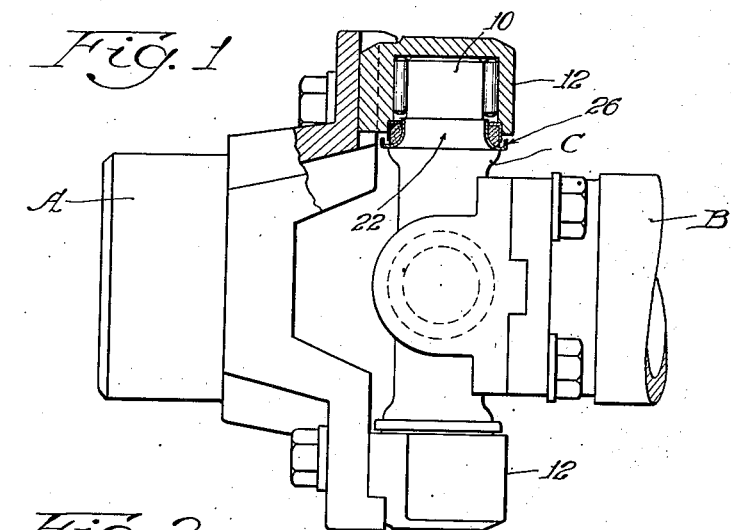
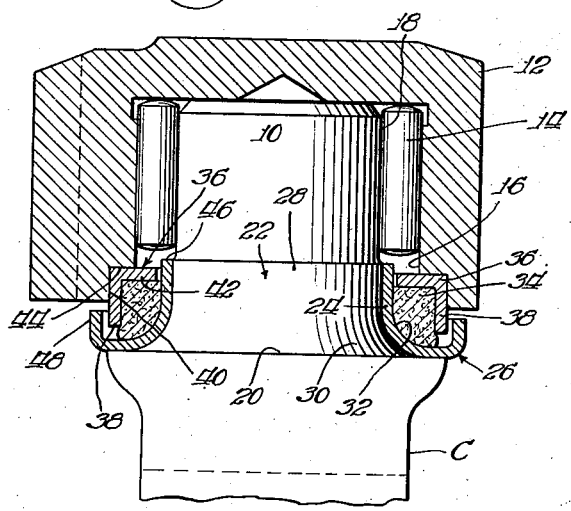
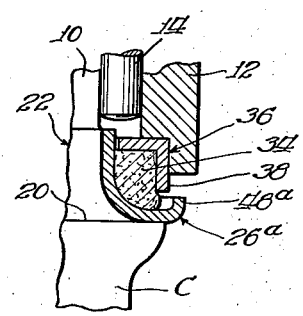
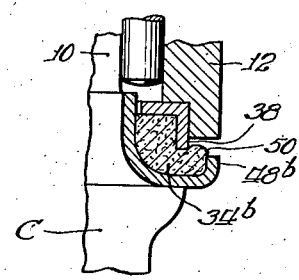
Inventors:
Carl E. Swenson and
Edmund B. Anderson
By: Edward C. Gritzbaugh
Atty.

Patented June 9, 1942

2,285,623

UNITED STATES PATENT OFFICE 2,285,623

UNIVERSAL JOINT

Carl E. Swenson and Edmund B. Anderson, Rockford, Ill., assignors to Borg-Warner Corporation, Chicago, Ill., a corporation of Illinois Application August 3, 1940, Serial No. 350,727

8 Claims. (Cl. 64—17)

This invention relates to universal joints of the type wherein torque is transmitted from one yoke to another by a spider having trunnions journaled through the medium of anti-friction rollers in bearing cups mounted on the arms of the yokes. In general, the invention has as its object to provide an improved mechanism for retaining the bearing rollers in proper position and for sealing the mouth of the bearing cup to the trunnion so as to prevent the entrance of destructive foreign matter and to retain the lubricant against escape.

In universal joints of the type under consideration which have been employed very extensively for a number of years, a ring of packing material such as cork, retained in a stamped sheet metal retainer ring pressed into the bearing cup fits against a flared base region of the trunnion which forms a continuation of the smooth round bearing surface thereof. In addition to the finishing of this flared base region of the trunnion, it has been customary to turn down the base of the trunnion below the shoulder so as to provide a cylindrical surface of sufficient accuracy to mount a collar which is pressed thereon and which telescopes around a projecting region of the packing retainer ring so as to form a centrifugal seal.

One of the objects of the present invention is to reduce the cost of manufacture of such a joint. To this end, the area of the trunnion which is finished by grinding is reduced to the minimum required for accommodating the anti-friction rollers, the flared base region of the trunnion above the shoulder is finished by only a turning operation, and the packing ring seats against the outer surface of an inner flange of the telescoping collar by means of which the latter is mounted directly upon the trunnion above the shoulder, completely eliminating the machining of the base of the trunnion below the shoulder.

In previous constructions of the general type under consideration, it has been customary to employ the packing retainer ring to perform a second function of retaining the rollers in proper operating position. To this end the packing retainer ring has been provided with a radial flange extending inwardly to a point just short of the surface of the trunnion, and in cooperative relation to the adjacent ends of the anti-friction roller.

Another object of the invention is to provide a seal arrangement wherein the inner flange of the guard collar, in addition to serving as a means for mounting the collar upon the trunnion and a seat for the packing ring, has the further function of retaining the anti-friction rollers in proper operating position in the assembled joint. The invention further aims in this respect to increase to a maximum the area of engagement of such inner flange and the trunnion, in proportion to the overall axial dimension of the trunnion and bearing cup assembly, while maintaining maximum roller length.

Other objects, the advantages and uses of the invention will become more apparent after reading the following specification and claims, and after consideration of the drawing forming a part of the specification, wherein:

Fig. 1 is a side elevation, partly in section, of a universal joint embodying the invention.

Fig. 2 is an enlargement of that portion of Fig. 1 which is shown in section.

Fig. 3 is a sectional view of the seal portion of a modified form of the joint; and Fig. 4 is a similar view of a further modification of the joint.

As an example of one form in which the invention may be embodied, I have shown in Fig. 1 a universal joint comprising yokes A and B adapted to be mounted upon the respective ends of a pair of shafts to be connected, and a spider C which connects the yokes A and B for the transmission of torque therebetween.

The spider C provides four trunnions 10, each received in a bearing cup 12 mounted on a respective yoke A or B, and journalled therein through the medium of anti-friction rollers 14. The rollers 14 are engaged between the cylindrical inner bearing surface 16 of the bearing cup and the cylindrical external bearing surface 18 of a trunnion 10. For maximum anti-friction, the bearing surfaces 16 and 18 are finished by a grinding operation. Such grinding operations are expensive, and it is, therefore, desired to maintain at a minimum the areas of ground finish.

At the base of the trunnion 10 there is formed a shoulder 20. Intermediate the shoulder 20 and the bearing surface 18 is a surface 22 against which is seated the inner flange 24 of a guard collar 26 that is roughly J-shaped in cross section. In order to insure against distortion of the collar 26 as it is pressed on to the trunnion, the surface 22 is finished by a turning operation which gives sufficient accuracy for the purpose without necessitating the resort to a ground finish.

The surface 22 has a cylindrical portion 28 merging into an outwardly flared portion 30 terminating at the shoulder 20. The flange 24 of the collar 26 has a corresponding shape, thus providing an outer surface 32 against which the packing ring 34 may seat under both radial and axial compression, and against which the packing ring may rub with a minimum of destructive action.

The packing ring is mounted in a retainer ring 36 having an axial flange 38 which is pressed into a counter bore 40 in the end of the bearing cup 12 and which projects therebeyond and telescopes into the flange 48 of the collar 26. The retainer ring 36 has a radial flange 42 which seats against a shoulder 44 defined between the counter-bore 40 and the bearing surface 16, and which extends inwardly to a radius just short of the exterior surface 32 of the cylindrical portion of the flange 24. Between the retainer ring 36 and the collar 26, the packing ring 34 is enclosed and supported against deformation by extrusion.

The flange 24 of the guard collar is projected entirely through the opening within the flange 42 of the retainer ring 36 so as to form a shoulder 46 for retaining the rollers 14 in an operative position. The edge of the flange 24 is employed to form this shoulder. This makes it possible to maintain the surfaces 18 and 28 at substantially the same radius, the radius of the surface 18 being slightly less than that of the surface 28 due to the finishing of the surface 18 by a grinding operation. Thus, the surface 28 may be formed in the same turning operation which prepares the bearing portion of the trunnion 10 for the grinding operation.

In the operation of the joint, the trunnion 10 and bearings 12 will have a planetary movement around the axes of the yoke A and B respectively, and at the same time, the trunnions 10 will oscillate to a limited extent within the bearing cups 12. Any particle of dirt which might tend to otherwise enter the space between the retainer ring 36 and the collar 26, will as a result of such planetary motion of the centrifugal seal, be impelled in a direction opposite to that which it would have to move in order to enter the space between the flange 38 and the collar 26. The oscillating movement referred to will result in the rubbing of the packing ring 34 against the bearing surface 32 of the flange 24, and will be accommodated by rolling movement of the rollers 14 between the bearing surfaces 18 and 16. Lubricant packed in the cavity between the trunnion and the bearing cup will tend to remain therein as a result of centrifugal force. When rotation ceases, the packing ring 34 will function to retain the lubricant against escape, and the shoulder 46 will retain the bearing rollers in proper operative position for resumed operation.

In the form of the invention shown in Fig. 3, the sealing mechanism is exactly the same as that shown in Fig. 2 with the exception that the collar 26 does not telescope the retainer ring 36. Flange 48a of the collar 26a which extends to a greater radius than that of the flange 38, and guards the space between the end of the flange 38 and the shoulder 20. The flanges 38 and 48a are somewhat separated axially. The flange 48a guards the space between the end of the flange 38 and the bottom of the collar 26a against particles of matter which may get in the path of orbital movement of the seal and thereby tend to be projected radially into such space. At the same time, the rush of air past the flange 48a induced centrifugally will sweep aside any particles tending to enter the very slight space existing between the flanges 38 and 48a in an axial direction.

In other respects, this design is identical to that shown in Fig. 2, and the same reference numerals are employed to designate the similar parts thereof.

The seal shown in Fig. 4 is the same as that shown in Fig. 3 with the exception that the radical space between the flanges 38 and 48b is larger, and the packing ring 34b is of such initial dimension that in the assembled joint it will be extruded into this space as indicated at 50. The extrusion of the packing ring provides a telescoping effect between the packing ring and the flange 38 which effectively excludes foreign particles. Similar reference characters are employed to designate the parts which are similar to the previously described forms of the invention.

While we have described our invention in connection with one specific embodiment thereof, it is to be understood that this is by way of illustration and not by way of limitation, and the scope of our invention is defined solely by the appended claims, which should be construed as broadly as the prior art will permit.

We claim:

1. In a universal joint embodying a trunnion and a bearing cup in which the trunnion is journalled through the medium of anti-friction rollers; a packing retainer ring mounted in the bearing cup, a ring of packing material mounted in said retainer ring, and a collar on the trunnion cooperating with said retainer ring to form a centrifugal seal, said collar having an inner flange mounted upon the base of the trunnion, the edge of said inner flange projecting axially beyond said ring of packing material in the direction of the rollers and forming a shoulder for retaining said rollers in operative position.

2. In a universal joint, a trunnion, a bearing cup receiving said trunnion, anti-friction rollers in bearing contact with said trunnion and the inner surface of the cup, a packing retainer ring mounted in the mouth of the cup, a ring of packing material mounted in said retainer ring, and a collar mounted on the base of the trunnion, said collar having an outer flange guarding the space between the base of the trunnion and said retainer ring against the entrance of foreign particles during operation, and an inner flange pressed upon the trunnion and extending through and beyond said retainer ring in the direction of the rollers, the edge of said inner flange forming a shoulder for retaining said bearing rollers in operating position.

3. In a universal joint, a trunnion, a bearing cup receiving said trunnion, anti-friction rollers interposed between said trunnion and the cup, a guard collar mounted on the base of the trunnion, a ring of packing material interposed between the mouth of the cup and said collar, said collar having an outer region guarding the extremity of said packing material against destructive foreign particles encountered in the orbit of revolution of the trunnion, and having an inner flange against which the packing material is seated, said flange extending through and beyond said ring of packing material and terminating in an edge forming a shoulder against which said rollers are retained in operating position.

4. In a universal joint, a trunnion, a bearing cup receiving the trunnion, anti-friction rollers interposed between the trunnion and cup, a packing retainer ring having an axial flange pressed into the end of the cup and projecting therebeyond and having a radial flange extending inwardly toward the trunnion, a ring of packing material mounted in said retainer ring, and a guard collar mounted on the base of the trunnion, said collar having an outer flange cooperating with the projecting axial flange of the retainer ring to form a centrifugal seal and having an inner flange pressed upon the base region of the trunnion, said inner flange having an outer surface against which said packing seats, said inner flange projecting through the opening defined by the inner edge of said radial flange, being closely encircled by said radial flange, extending beyond said radial flange in the direction of said rollers, and terminating in an edge which provides a shoulder against which said rollers are retained in operating position.

5. A universal joint as defined in the preceding claim, wherein said outer flange of the collar telescopes around the axial flange of the retainer ring.

6. A universal joint as defined in claim 4, wherein said outer flange terminates short of said axial flange in an axial direction, the radius of said outer flange being greater than that of said axial flange.

7. A universal joint as defined in claim 4, wherein said outer flange has its inner surface spaced radially outwardly of the outer surface of said axial flange and wherein said ring of packing material is extruded into said space.

8. A universal joint as defined in claim 4, wherein said trunnion has an outer region providing a finished cylindrical surface against which said rollers operate and a base region providing an unfinished annular surface on which said collar is mounted.

CARL E. SWENSON.
EDMUND B. ANDERSON.